United States Patent Office 3,554,803
Patented Jan. 12, 1971

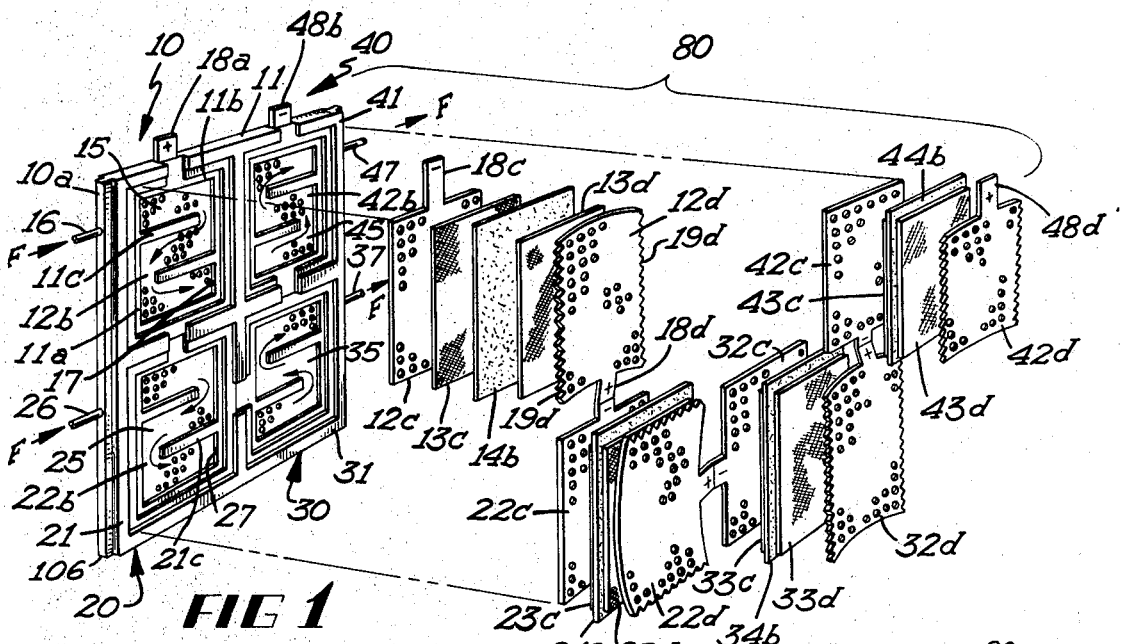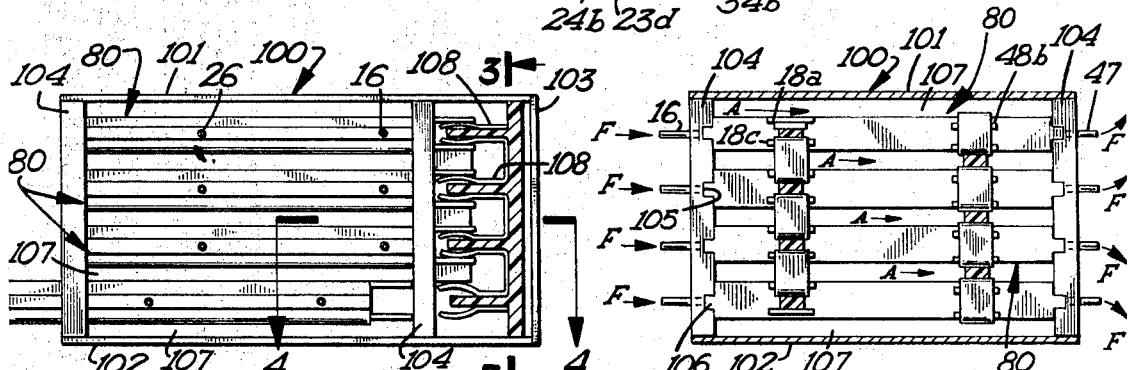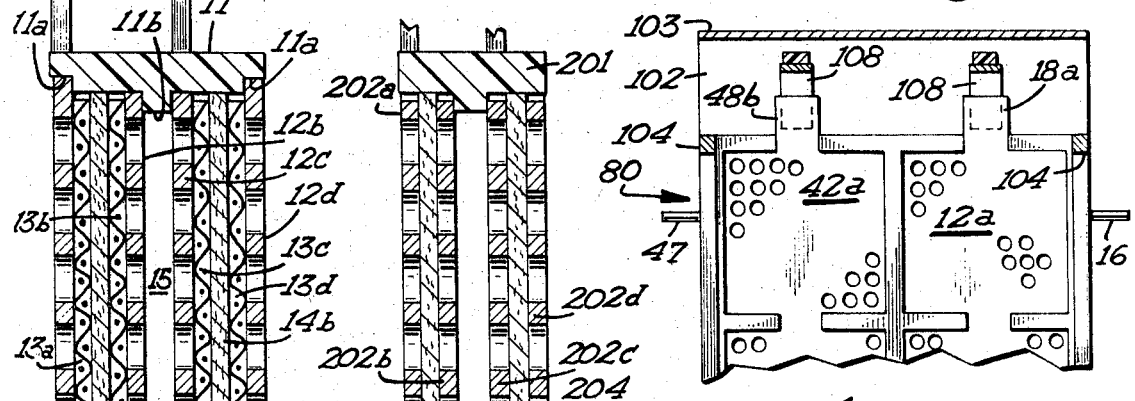

3,554,803
FUEL CELL DESIGNED FOR EFFICIENT STACKING
Armand R. Poirier, New Brighton, Minn., assignor, by mesne assignments, to Studebaker Corporation, South Bend, Ind., a corporation of Delaware
Filed Aug. 24, 1967, Ser. No. 663,110
Int. Cl. H01m 27/02
U.S. Cl. 136—86
8 Claims

ABSTRACT OF THE DISCLOSURE

A fuel cell battery having a plurality of unitized duplex fuel cells, each being comprised of conventional fuel cell elements. The unitized duplex cells are mounted in the battery such that each cell operates independently of all other cells in the battery. A fluid fuel circulates inside each duplex cell and a fluid reactant circulates between adjacent duplex cells, thereby permitting each cell to be removed for repair or replacement without the disassembly of the entire battery.

BACKGROUND OF THE INVENTION

The invention pertains to a fuel cell of the type employing a fluid fuel reactant, an oxygen containing fluid reactant, and an electrolyte.

In the prior art, fuel cells have been designed for dependent association with adjacent cells to form a battery. For example, the pressure for holding a series of identical cells together in associated relationship has generally been applied through clamping means which acts simultaneously on each of the cells. The simultaneous clamping means serves to hold the component layers of each fuel cell together as well as to hold adjacent fuel cells in associated relationship. The customary clamping means also serves to seal the cells at their periphery to thereby define the fluid reactant cavities. This interdependency of adjacent fuel cells creates a number of problems. None of the fuel cells can be assembled apart from the assembly of the entire battery and individual cells cannot be tested until the battery is assembled. After assembly, moreover, if one of the fuel cells proves to be faulty and replacement is necessary the entire battery must be disassembled to replace the defective cell. Thus the interdependency of adjacent fuel cells represents an undesirable feature of prior art fuel cell batteries.

SUMMARY OF THE INVENTION

The present invention eliminates many of the problems associated with the fuel cells of the prior art by providing a unique unitized duplex fuel cell. The duplex cell of the present invention may be individually tested prior to placement in a battery. After placement, individual cells may be easily tested in place and defective cells may be easily removed from the battery and replaced.

The invention comprises a plurality of fuel cells of the type employing a fluid fuel constituting a first fluid reactant, a second fluid reactant having an oxygen constituent, and an electrolyte comprising: a frame, a first electrode extending substantially over one face of said frame; an electrolyte containing matrix disposed against one face of said first electrode; a second electrode disposed against the outer face of said electrolyte containing matrix; means for introducing one of said fluid reactants into the interior of said frame member and into contact with the exposed face of said first electrode; means for securing a plurality of said cells together in spaced relationship to allow circulation between said cells of the fluid reactant other than that introduced into said frame; and means for electrically connecting the current collectors of said fuel cells to output terminals.

The primary object of the present invention is to provide a unitized duplex fuel cell which may be independently associated with similar fuel cells to thereby form a fuel cell battery.

It is a further object to provide a fuel cell battery in which individual duplex fuel cells are unitized to allow individual testing both prior to and after association with adjacent fuel cells in a fuel cell battery, and to allow removal and replacement of individual duplex fuel cells without disassembly of adjacent cells.

It is a further object to provide a fuel cell battery consisting of a plurality of duplex fuel cells in which a common fluid fuel reactant cavity is provided for adjacent cells which make up one unitized duplex cell, and a common oxygen containing reactant cavity is provided for adjacent duplex cells, to thereby promote independent duplex cell operation and efficient cell temperature control through control of the temperature of the oxygen containing reactant.

DESCRIPTION OF THE DRAWING

Each of the above objects is fulfilled in the specific embodiments disclosed in the drawing wherein:

FIG. 1 is a partially exploded perspective view of four unitized duplex fuel cells disposed in side-by-side relationship and series connected. The assembly of FIG. 1 comprises one octa-cell made up of four unitized duplex cells. The duplex cell, consisting of one quarter of the octa-cell shown in FIG. 1, comprises the basic unit of the present invention;

FIG. 2 is a side view of a fuel cell battery consisting of four independently associated octa-cells. FIG. 2 also shows the rack and series electrical connections for the associated octa-cells;

FIG. 3 is a vertical sectional view taken on the line 3—3 of FIG. 2 and shows the electrical series connections for each octa-cell and the tongue-and-groove relationship between the octa-cell frames and the battery rack;

FIG. 4 is a horizontal sectional view taken on the line 4—4 of FIG. 2;

FIG. 5 is an enlarged partial sectional view of one unitized duplex cell which comprises the basic unit of the present invention; and FIG. 6 is an enlarged partial sectional view of a second embodiment of a duplex cell in which the electrodes consist of foraminous plates.

DESCRIPTION OF THE ILLUSTRATED EMBODIMENTS

The basic unit of the present invention is the unitized duplex fuel cell which constitutes one-quarter of the octa-cell shown in FIG. 1. With reference primarily to FIG. 1 and FIG. 5, each of the duplex cells consist of two identical component fuel cells disposed in spaced relationship, to thereby define a fluid reactant cavity between the two. The octa-cell shown in FIG. 1 includes four unitized duplex cells 10, 20, 30, and 40.

The identical components in the four duplex cells, 10, 20, 30, and 40, are assigned reference numerals in which corresponding parts have the same unit digit and letter designations. The tens digit of each reference numeral corresponds with the tens digit assigned to the particular duplex cell. With the foregoing convention established, it becomes necessary to describe but one duplex fuel cell, it being understood that the other duplex cells which make up the octa-cell are of identical construction configuration.

With reference to FIGS. 1 and 5, duplex fuel cell 10 includes a frame portion 11, which defines shoulders 11a, and includes internal flange 11b and internal current collectors 12a (shown partially in section in FIG. 5), 12b, 12c and 12d, all of which consist of foraminous metal plates, are mounted to frame portion 11. Current collectors 12a and 12d define the exterior face of duplex cell 10 and are seated at their periphery on shoulder 11a of frame 11 in a manner to be described more particularly below. Current collectors 12b and 12c define the interior face of the duplex cell 10 and are seated against internal flange 11b. Four electrodes 13a, 13b, 13c and 13d which each consist of a mesh or screen, are disposed inwardly of current collectors 12a, 12b, 12c and 12d, respectively, as best seen in FIGS. 1 and 5. An electrolyte containing matrix 14a and 14b is placed between electrode 13a and 13b, and 13c and 13d, respectively. Each of the component layers is in close contact. That is, current collector 12a, electrode 13a, electrolyte containing matrix 14a, electrode 13b, and current collector 12b, are in contact at their respective interfaces. The same is true for current collectors 12c and 12d, electrodes 13c and 13d and electrolyte containing matrix 14b. The means for insuring close interface contact is described more particularly below.

In the form of the invention illustrated in FIGS. 1 and 5, electrodes 13a and 13d serve as cathodes while electrodes 13b and 13c serve as anodes.

The fuel cell layers in each duplex cell are spaced by means of internal flange 11b and internal spacers and fluid reactant flow guides 11c, to thereby define a fluid fuel reactant cavity 15. Fluid fuel reactant cavity 15 is served by an inlet 16 and an outlet 17.

Duplex fuel cell 10 is provided with four output contacts formed integrally with current collectors 12a, b, c and d respectively. While the contact formed integrally with current collector 12b is not shown, contacts 18a, 18c and 18d appear in FIG. 1. Output contacts 18a and 18c serve along with contacts 48b and 48d of duplex cell 40 as octa-cell output contacts.

Current collectors 12a, 12b, 12c and 12d may be formed of the metal tantalum, although other metals may also be used. While the thickness of the current collectors may vary, a thickness of 0.008 inch has been found to be suitable. The number of holes in each current collector may also vary considerably. Experimentation has indicated, however, that about 100 to 121 holes per current collector (each of the holes having a diameter of ⅛ inch and each of the current collectors having an area of about 6.25 square inches) is suitable.

The exterior current collectors 12a and 12d of duplex fuel cell 10 are initially warped as may be seen with respect to current collector 12d shown in FIG. 1. The warping of the exterior current collectors such as current collector 12d, along with teeth 19d provided on opposite edges thereof, provides a means for insuring close interface contact among the elements of each component layer of each duplex fuel cell. Thus, when considering the components associated with current collector 12d, for example, the current collector 12c, the electrode 13c, the electrolyte containing matrix 14b, and the electrode 13d are placed in position against shoulder 11b. The current collector 12d is then placed into position against shoulder 11a and the teeth 19d are pushed inwardly until the current collector 12d is flat. This causes teeth 19d to bite into shoulder 11a firmly retaining the elements of the fuel cell. Due to the initially warped feature of current collector 12d, pressure is placed upon the components insuring a uniform contact at the interface between the current collectors, electrodes and matrix.

Electrodes 13a, 13b, 13c and 13d consist of a tantalum mesh, in the illustrated embodiment. The electrode area may be 4 square inches per electrode and a suitable mesh size is No. 250 (U.S. Sieve Series). Each of the electrodes is coated with a catalyst consisting of finely divided platinum. The platinum particles are held in associated relationship with the electrodes by a polytetrafluoroethylene binder.

The electrolyte containing matrix shown at 14a and 14b may consist of a 0.03 inch thick polytetrafluoroethylene floc or some other fibrous sheet and the electrolyte with which the matrix is saturated may consist of phosphoric acid ($H_3PO_4$) in a concentration of 98%. Other electrolyte solutions may be used such as sulphuric acid and potassium hydroxide.

Duplex cells 10, 20, 30 and 40, are shown in associated relationship in FIG. 1, to thereby constitute an octa-cell. In the octa-cell shown in FIG. 1, inlet conduits 16 and 26 are provided for the purpose of introducing a fluid fuel reactant into the fluid reactant cavity 15 and 25 of duplex cells 10 and 20. Fluid fuel reactant F follows the path of arrows F around fluid fuel reactant fuel guides 11c and 21c, through the fluid fuel reactant cavity 15 and 25, respectively, and exits from duplex cells 10 and 20 at outlets 17 and 27, respectively, shown in FIG. 1. The fuel then enters duplex cells 30 and 40, from outlets 17 and 27, respectively, and after passing through the internal fluid reactant cavities 35 and 45, respectively, exits from the octa-cell at fuel outlets 47 and 37.

A plurality of octa-cells 80 may be associated to constitute a battery, as shown in FIGS. 2, 3 and 4. For that purpose, a rack 100 is provided. The number of octa-cells 80 associated in rack 100 may vary. Rack 100, shown in the illustrated embodiment, has the capacity to accept four octa-cells 80 and includes an upper plate member 101, a lower plate member 102, and an end plate member 103. Four corner posts 104 are provided. Each of the corner posts 104 contains four grooves 105 which accept ribs or tongues 106 of each octa-cell 80. When associated in spaced relationship to thereby form a fuel cell battery, octa-cells 80 define fluid reactant cavities 107 as shown in FIGS. 2 and 3. In the embodiment shown, the oxygen containing fluid reactant (air) is passed through fluid reactant cavities 107 and is designated by arrows A in FIG. 3.

As octa-cells 80 are inserted into rack 101, the output contacts 18a, 18c, 48b and 48d thereof engage battery rack contacts 108. Contacts 108 are provided with sprung, arcuate, contact portions, which engage the output terminals of the octa-cell 80. In the embodiment shown, electrical contacts 108 provide a series connection between the output terminals of adjacent octa-cells. Suitable battery output terminals may be provided to conduct current from the battery of fuel cells shown. Octa-cells 80 are independently associated in racks 100. More particularly, individual octa-cells 80 may be removed from associated relationship with adjacent cells for testing. Defective fuel cells may be conveniently replaced in rack 100. Moreover, a removal of one octa-cell does not prevent the operation of the remaining cells in the battery as long as a conductor is supplied for bridging contacts left open by the removal of the octa-cell. The fluid reactant cavities 107 formed by adjacent octa-cells 80 provide a highly desirable means for circulating oxygen containing fluid reactant (typically air) and controlling the temperature of the cells during operation.

OPERATION

The fluid fuel reactant used in the operation of the duplex fuel cell described above, may vary widely, the critical consideration being only that the fluid fuel react with oxygen. Impure hydrogen (15% $H_2$ and 85% $N_2$) may be used. Reforming gas (for example, 70% $H_2$, 18.2% CO, 10.5% $CO_2$ and 1.3% $CH_4$) is also a suitable fuel. The fuel path may be best understood with reference to FIG. 1 as shown by arrows F. The fluid fuel enters the internal cavity in each duplex cell and is exposed to the electrolyte electrode (anode) interface in each of the component layers of each duplex cell.

The oxygen containing reactant may be air and is caused to flow through fluid reactant cavities 107 as shown by arrows A in FIG. 3, to thereby introduce air to the electrolyte electrode (cathode) interface in each of the component layers of each duplex cell.

When a fluid fuel having a hydrogen constituent is used, the electro-chemical reaction which occurs in the duplex cell may be described by the following equations. The anode-electrolyte interface reaction may be expressed as:

$$H_2 + H_2O \xrightarrow[350°F]{PT} 4H^+ + 4e^-$$

The cathode-electrolyte interface reaction may be expressed as:

$$O_2 + 4H^+ + 4e^- \xrightarrow[350°F]{PT} 2H_2O$$

With phosphoric acid as the electrolyte, the operating temperature of the duplex cell should be maintained in the range of 250–350° F. for high current densities. Because of polarization heat produced within the fuel cell when current is being withdrawn, sufficient heat is generated to maintain fuel cell operating temperature. The internal heating effect varies with the amount of current being withdrawn from the cell. To maintain the cell at a temperature of 350° F., as the heating effect of the electrochemical reaction varies, the flow rate of the input oxygen containing fluid reactant must be varied accordingly.

The table which follows provides examples of fuel cells constructed according to the present invention. The data shown below have been obtained through performance runs of one duplex cell consisting of one-quarter of the octa-cell shown in FIG. 1. In each case the oxygen containing fluid reactant was air. The cell operating temperature in each case was maintained at 350° F. by control of the temperature of the air. The catalyst consisted of finely divided platinum black bonded to the electrode mesh with polytetrafluoroethylene. The electrodes consisted of a No. 250 (U.S. Sieve Series) tantalum mesh. The electrode area was 4 square inches per electrode. The electrolyte containing matrix consisted of 0.037-inch Teflon floc, saturated with a 98% solution of phosphoric acid ($H_3PO_4$). The current collectors consisted of a tantalum plate having a thickness of 0.008 inch and an area of 6.25 square inches. The current collector perforations were ⅛ inch in diameter except for the perforations in the current collectors of cell No. 2, Example IV, which were 1/16 inch in diameter.

TABLE

| Example | Cell No. | No. perforations | Fuel | Voltage at 2 amps, volts | Current at 0.75 v., amps | Resistance, ohms | Open circuit, voltage volts |
| --- | --- | --- | --- | --- | --- | --- | --- |
| I | 1 | 64 | 15% $H_2$, 85% N | 0.385 | 0.70 | 0.050 | 0.880 |
|   | 2 | 100 |  | 0.700 | 1.34 | 0.040 | 0.970 |
| II | 1 | 121 | 15% $H_2$, 85% N | 0.725 | 1.78 | 0.036 | 9.995 |
| 2 | 2 | 100 |  | 0.740 | 1.90 | 0.035 | 0.980 |
| III | 1 | 121 | 79% $H_2$, 18.2% CO | 0.790 | 2.40 | 0.032 | 0.050 |
|   | 2 | 100 | 10.5% $CO_2$, 1.3% $CH_4$ | 0.780 | 2.30 | 0.032 | 1.030 |
| IV | 1 | 121 | 70% H, 18.2% CO | 0.799 | 2.37 | 0.030 | 1.00 |
|   | 2 | [1] 400 | 10.5% $CO_2$ and 1.3% $CH_4$ | 0.785 | 2.34 | 0.032 | 1.00 |

[1] 1/16″ dia.

While the embodiment shown in FIGS. 1–5 is preferred for maximum efficiency, it has been found that the electrode mesh may be eliminated as a component of the fuel cell shown with its function being taken over by foraminous plates. Thus, as shown in FIG. 6, a duplex cell 200 may be formed in frame member 201 with the provision of perforated electrode-current collectors 2–2a, 202b, 202c and 202d. Electrolyte containing matrixes 203a and 203b are placed between electrode-current collectors 202a and 202b, and 202c and 202d, respectively. A platinum black catalyst may be bonded to the inside face of the electrode-current collectors. The component cell layers are spaced in frame member 201 to define a fluid fuel reactant cavity 204.

Similarly, the duplex cell of the present invention may be operated, though below maximum efficiency, without current collectors. Thus, current may be drawn directly from the tantalum mesh electrodes and the foraminous current collector plates may be omitted.

It must be recognized that variations may be made in the illustrated embodiments without departing from the scope of the present invention. Various means may be utilized for conducting the oxygen containing fluid reactant (usually air) over the duplex cells, the only requirement being that the air come in contact with the electrolyte containing matrix-cathode interface. The means for stacking or associating the duplex fuel cells may vary widely as long as the cells are in an associated parallel spaced relationship. In addition, it must be recognized that the octa-cell design shown is not critical since the duplex cells may be associated in any number of ways with similar duplex cells, the critical association residing in the spaced parallel relationship between duplex cells and not in the side-by-side relationship between the four duplex cells which comprise one octa-cell. The electrical contact means for electrically connecting adjacent octacells may also vary. Any manner of contact may be employed as long as an efficient and non-corrosive electrical contact is provided. Other variations may be made in the illustrated embodiments without departing from the scope of the invention, which is to be limited only by the appended claims.

What is claimed is:
1. In a fuel cell battery of the type employing a fluid fuel constituting a first fluid reactant, a second fluid reactant having an oxygen constituent, and an electrolyte; a plurality of duplex fuel cells, each comprising:
   a pair of fuel cells, each comprising,
      a first electrode,
      a second electrode, and
      an electrolyte containing matrix disposed between said first and second electrodes and extending substantially over the faces of said first and second electrodes thereof;
   a frame for securing the fuel cells of said pair of fuel cells in spaced relationship to thereby define a fluid reactant cavity between the opposed faces of said fuel cells, said frame having a plurality of projecting portions between the opposed faces of said fuel cells and acting as fluid reactant guides to direct one of said fluid reactants in a circuitous path across the entire faces of the opposed sides of said fuel cells;
   means for introducing one of said fluid reactants into said fluid reactant cavity comprising at least one tubular passage extending through said frame and communicating with the interior of said cavity, the maximum transverse dimension of any such passage being relatively small compared with any longitudinal dimension of said cavity with which it is connected;
   means for securing a plurality of said duplex cells together in spaced relationship to provide an open space between cells adapted to be exposed to the other of said fluid reactants;
   means for electrically connecting said cells, said means comprising male and female connectors, one of said connectors being connected to said cell, and one of said connectors being resilient and associated with the other of said connectors to permit ready connection and disconnection of any of said cells.

2. The fuel cell battery of claim 1 wherein said means for securing a plurality of said duplex cells together in spaced relationship includes a rack having means for slidably inserting and removing said duplex cells.

3. The fuel cell battery of claim 2 wherein means for slidably inserting and removing said cells includes a rib at the periphery of each of the frames of said cells, said rib designed to cooperate with a corresponding groove in said rack.

4. The fuel cell battery of claim 2 wherein one of said connectors is mounted on said rack.

5. The fuel cell battery of claim 4 wherein said female connector is connected to said cell.

6. The fuel cell battery of claim 4 wherein the connector mounted on said rack is resilient.

7. The fuel cell battery of claim 1 wherein said connector connected to said cell is integrally formed with the electrodes of said cell.

8. The fuel cell battery of claim 7 wherein said male connector is mounted on said means for securing a plurality of said duplex cells in spaced relationship, said male connector being resilient and designed for cooperation with the connectors integrally formed with the electrodes of said cells.

References Cited
UNITED STATES PATENTS

| | | | |
|---|---|---|---|
| 268,174 | 11/1882 | Blanchard | 136—86 |
| 1,163,834 | 12/1915 | Little | 136—86 |
| 3,458,357 | 7/1969 | Truitt | 136—86 |
| 2,980,749 | 4/1961 | Broers | 136—86 |
| 3,126,302 | 3/1964 | Drushella | 136—86 |
| 3,146,131 | 8/1964 | Linden et al. | 136—86 |
| 3,297,484 | 1/1967 | Niedrach | 136—86 |
| 3,436,272 | 4/1969 | Gelting | 136—86 |

ALLEN B. CURTIS, Primary Examiner

U.S. Cl. X.R.

136—134